Jan. 23, 1923.
A. LICCIARDELLO.
AUTOMOBILE LOCK.
FILED JAN. 29, 1921.
1,443,227
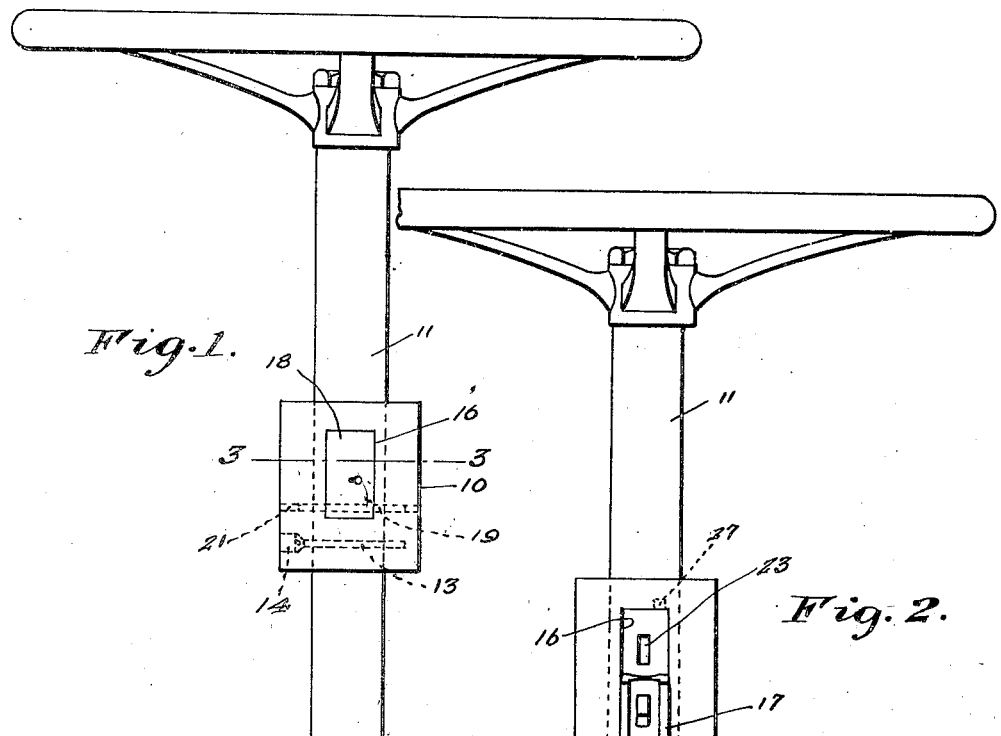
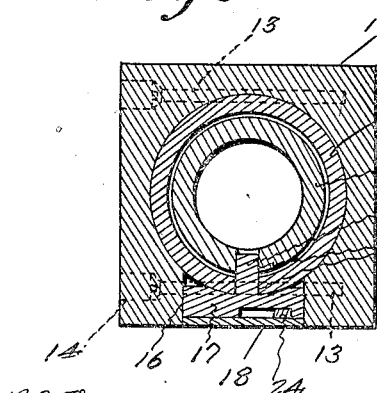
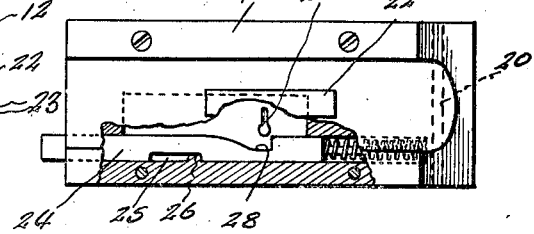

Patented Jan. 23, 1923.

1,443,227

UNITED STATES PATENT OFFICE.

ALFRED LICCIARDELLO, OF LAWRENCE, MASSACHUSETTS.

AUTOMOBILE LOCK.

Application filed January 29, 1921. Serial No. 440,959.

*To all whom it may concern:*

Be it known that I, ALFRED LICCIARDELLO, a subject of the King of Italy, residing at Lawrence, in the county of Essex and State of Massachusetts, have invented new and useful Improvements in Automobile Locks, of which the following is a specification.

This invention relates to automobile locks, and comprehends the provision of a device adapted to be secured upon the steering column and equipped with means to engage the steering post to prevent the latter from being turned, and thereby making it impossible to steer the vehicle.

More specifically stated, the invention embodies a casting adapted to be mounted upon the steering column, the casting having associated therewith a pivoted locking device including a lug adapted to be received by the alined openings in the steering column and steering post respectively, and means for holding the pivoted locking element in an active position.

The nature and advantages of the invention will be better understood when the following detail description is read in connection with the accompanying drawing, the invention residing in the combination, construction and arrangement of parts as claimed.

In the drawing forming part of this application, like numerals of reference indicate similar parts in the several views and wherein:—

Figure 1 is a side elevation of the device showing it applied to a steering column.

Figure 2 is a similar view to Figure 1 showing the pivoted locking device in an inactive position.

Figure 3 is a sectional view taken on line 3—3 of Figure 1.

Figure 4 is a view of the device partly in section.

The device forming the subject matter of my invention comprises a casting 10 which may be of any suitable size and material and bored to be snugly fitted upon the steering column 11 which receives the steering post 12. The casting is securely maintained in position upon the column 11 by means of parallel pins 13 which are arranged at the opposite sides of the steering column tangentially with respect thereto, a portion of each pin being arranged in a notch formed in the steering column at the point of contact between the pins 13 and the steering column as shown. The heads of the pins 13 are embedded in the casting 10, while positioned in the bores 14 through which the pins are passed, are plugs of any suitable material which prevent the pins 13 from being removed. The casting is cut away as at 16, to provide an opening, while pivoted within the opening is a locking device to be presently described.

The locking device is in the nature of a door to close the opening 16, and includes inner and outer members 17 and 18 respectively which are secured together in any suitable manner. The member 18 is pivoted, the pivot 19 being passed through a bore 20 in the casting, and the ends of this bore is filled with suitable material 21 to prevent the pivot from being removed. The inner member 17 is shaped to conform to the curvature of the steering column 11 with which it contacts when the locking device is in an active position as shown in Figure 3. Projecting from the inner member 17 is a lug 22 which when the locking device is swung to an active position passes through the alined openings 23 provided in the steering column and steering post respectively as shown in Figure 3.

Slidably arranged between the inner and outer members 17 and 18 respectively of the locking device is a spring pressed bolt 24 which is provided with a notch 25 to receive a projection 26 formed on the member 17, and which projection limits the movement of the bolt in one direction. The opposed extremity of the locking bolt is received within a recess 27 formed in the casting 10 when the locking device is in the position shown in Figure 3. The bolt is also provided with a cut away portion 28 to accommodate a key of suitable construction to retract the bolt, the key being passed through the key-hole slot 29.

In practice, the locking device is normally arranged in an inactive position as shown in Figure 2, to permit the steering post to be manipulated in a proper manner to steer the vehicle. When it is desired to lock the vehicle, the locking device is swung to the position shown in Figure 3, so that the steering post cannot be turned thereby prohibiting any one from steering the vehicle. If desired, the openings in the steering post and steering column may be arranged relatively so that the opening in the steering post will register with the opening in the steering column only when the front wheels of the vehicle are turned at an angle with respect to the rear wheels, or in other words, in the direction of the curve, and when locking the steering post in this position it is impossible to move the vehicle under any circumstances.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim is:—

In an automobile lock the combination with a steering column and steering post having openings adapted to register, said steering column being provided with a pair of opposing transversely disposed notches arranged adjacent the openings therein, of a casting positioned around said steering column and having a pair of horizontally disposed bores therethrough, a pin embedded within each bore providing an open portion of the bore on one side of each pin and the central portion of each pin arranged in the adjacent notch to securely maintain the casting in its respective position, a plug adapted to close the open portion of the bores to prevent the removal of the pins, said casting being provided on one of its sides with a rectangular opening aligned with the openings in the steering column and steering post respectively, said rectangular opening being of larger diameter than the last mentioned openings, a door pivotally secured to said casting and adapted to close said rectangular opening, a lug rigidly secured to said door and adapted to be received by the openings in the steering column and steering post, to prevent the turning of the steering post, a spring pressed locking bolt associated with the door for the purpose specified and means for actuating the spring pressed locking bolt.

In testimony whereof I affix my signature.

ALFRED LICCIARDELLO.